C. B. KIRKHAM.
LUBRICATING SYSTEM.
APPLICATION FILED SEPT. 18, 1915.

1,286,345.

Patented Dec. 3, 1918.
3 SHEETS—SHEET 3.

Inventor
CHARLES B. KIRKHAM.
by
Attorney

UNITED STATES PATENT OFFICE.

CHARLES B. KIRKHAM, OF BUFFALO, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

LUBRICATING SYSTEM.

1,286,345.

Specification of Letters Patent.

Patented Dec. 3, 1918.

Application filed September 18, 1915. Serial No. 51,481.

*To all whom it may concern:*

Be it known that I, CHARLES B. KIRKHAM, a citizen of the United States, residing at Buffalo, in the county of Erie and State of New York, have invented certain new and useful Improvements in Lubricating Systems, of which the following is a specification.

My present invention relates broadly to new and useful improvements in lubricating systems for internal combustion engines and has particular reference to an improved force feed system which is especially designed for use in connection with the power plants of aircraft.

One of the principal difficulties which it has heretofore been sought to overcome in lubricating systems for the power plants of aeroplanes is the insuring of a constant supply of lubricant from the main reservoir to the force pump. In this connection it will be appreciated that the lubricant within the main reservoir at the bottom of the engine crank casing is continually shifting, due of course to the changes in the inclination of the engine bed to the horizontal as when the craft is ascending or descending.

It is therefore one of the principal objects of the present invention to provide a lubricating system in which means are provided to insure a constant supply of lubricant to the feed pump regardless of the inclination of the engine bed to the horizontal.

A correlated object of the invention is to provide a means whereby the oil confined to the reservoir cannot, under any circumstances, drain to a point remote from the pump; thereby accordingly insuring an effectual distribution of the lubricant via the pump to the machine parts without regard to the angle of inclination of such parts.

Another and important object of the invention is to provide a feed pump which is relatively simple in construction and may therefore be cheaply manufactured, and is so designed that it may be quickly mounted in the crank casing or removed therefrom as a unit and without requiring that any portions of the crank casing itself or associated parts of the engine be removed.

A still further object is to so design the pump that the lubricant after passing the circuit of lubricated machine parts will be discharged directly into the main reservoir and then drawn from the reservoir after having been first filtered by a screening element and returned along the feed line to the starting point of the lubricated circuit.

The above and other incidental objects of a similar nature which will be hereinafter more specifically treated, are accomplished by such means as are illustrated in the accompanying drawings, described in the following specification and then more particularly pointed out in the claims which are appended hereto and form a part of this application.

With reference to the drawings wherein there has been illustrated the preferred embodiment of the invention as it is reduced to practice, and throughout the several views of which similar reference numerals designate corresponding parts.

Before taking up the detail description of my invention I desire to explain that while the system and apparatus associated therewith has been illustrated in the accompanying drawings in connection with an eight cylinder four cycle engine, it may nevertheless be as readily and as efficiently applied to any other type of internal combustion engine without departing in any way from the spirit or scope of the invention, and without requiring that any consequential modification be made.

Figure 1:
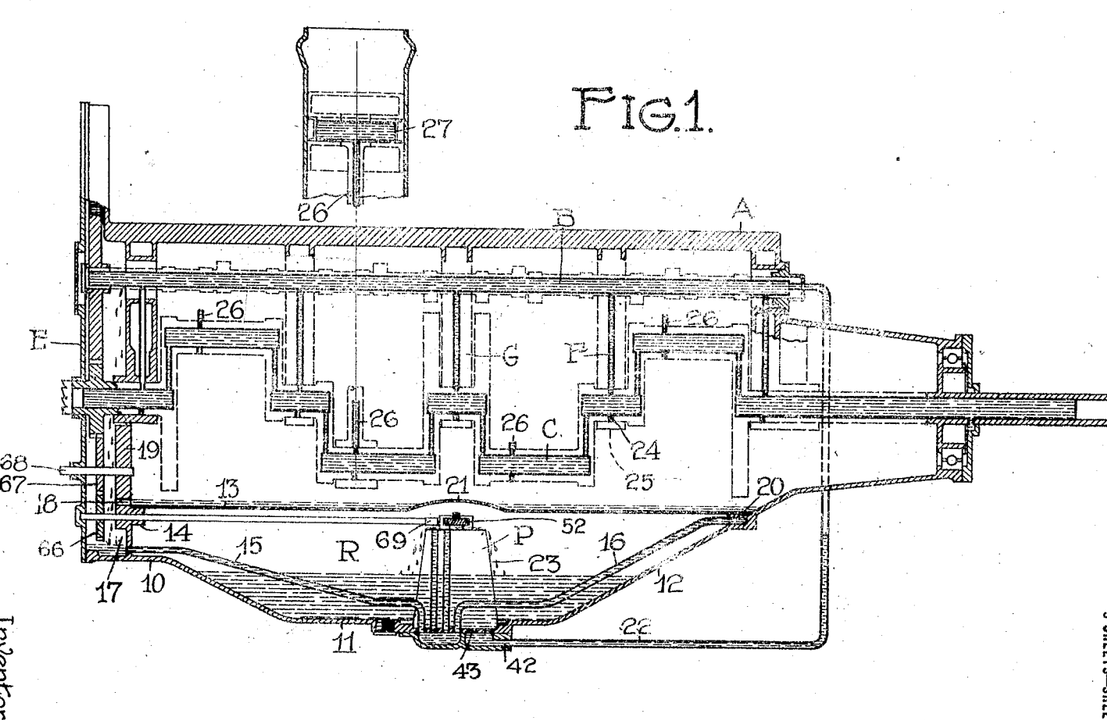
Figure 1 is a diagrammatic view illustrating the general system of lubrication embodied in the present invention.

In describing the invention as embodied in the accompanying drawings reference is now had particularly to Fig. 1 wherein is diagrammatically illustrated the path of the lubricant through the lubricated parts of the engine; the main supply reservoir for the lubricant; the pump whereby the lubricant is fed from the supply reservoir to the lubricated parts; the drip pan upon which falls the lubricant escaping from the bearings; and the conduits which connect each terminal of the drip pan with the pump.

Figure 2:
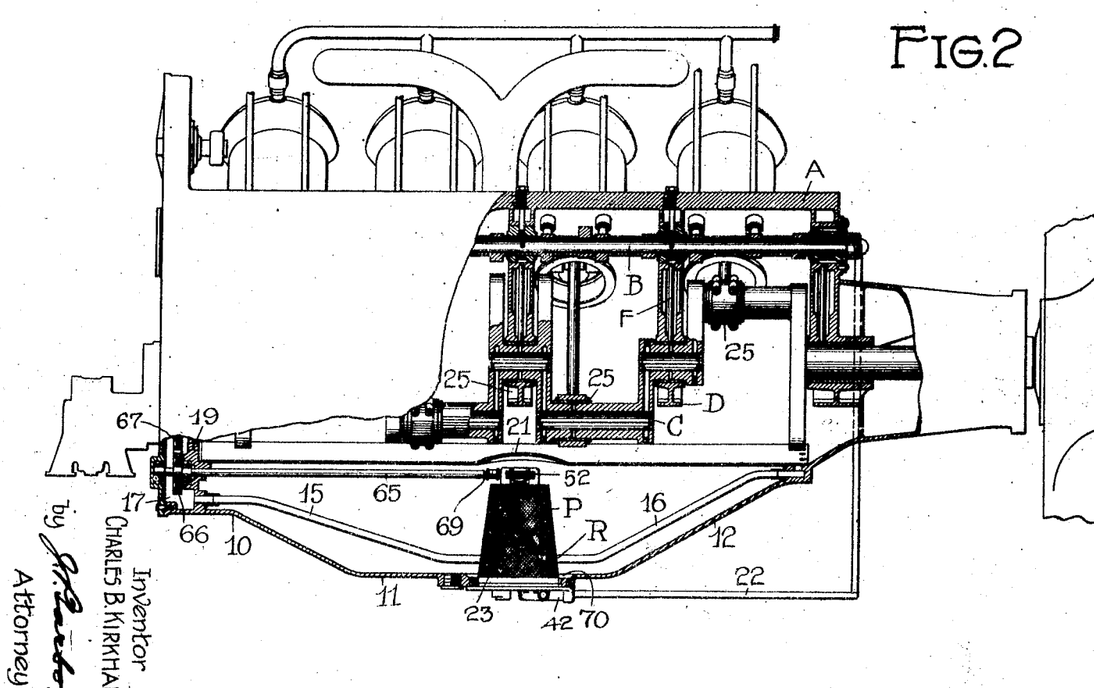
Fig. 2 is a view partly in side elevation and partly in longitudinal section of an internal combustion engine equipped with the present lubricating system.
Figure 3:
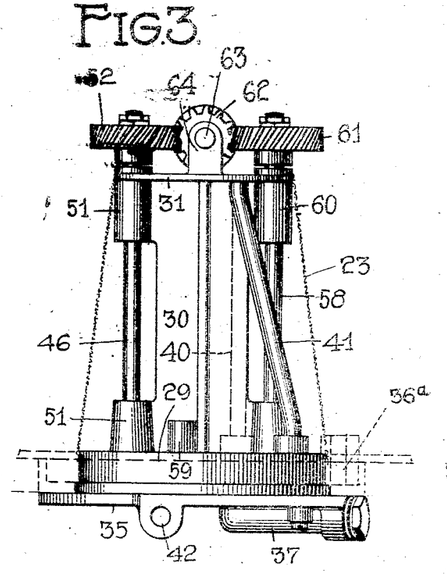
Fig. 3 is a detail view of the preferred form of pump employed.
Figure 4:
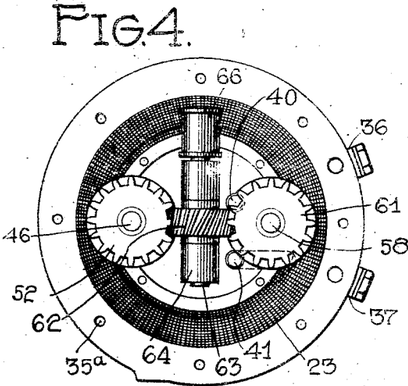
Fig. 4 is a top plan view of the pump.
Figure 5:
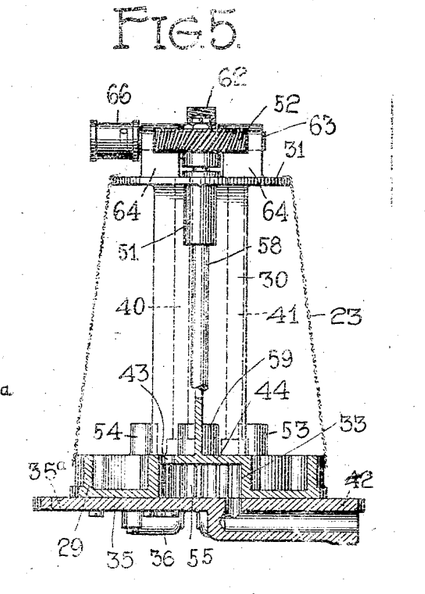
Fig. 5 is a composite view partly in elevation in the plane at right angles to the plane of Fig. 3, and partly in vertical section.

The engine generally designated as an entirety by the letter A is provided with the usual cam shaft B and crank shaft C which members are journaled in suitable bearings designated D and are housed in the crank casing indicated at E. The cam and crank shafts B and C are provided throughout their entire length with oil ducts or bores, as best illustrated in Figs. 1 and 2, the lubricant being supplied to the ducts of the crank shaft by means of ducts or conduits F which extend through the stationary bearings D of the cam shaft. The lubricant is fed from the main supply reservoir, indicated at R, through the cam and crank shafts and ducts associated therewith by the pump P in a manner and along a path which will be hereinafter fully explained.

The lubricant reservoir previously designated R is defined by the bottom wall 10 of the crank case E. This bottom wall is provided with a flat horizontal central portion 11 which is disposed a considerable distance below the plane of the perimeter of the wall 10 and is connected therewith by means of the sloping portions 12. These sloping walls 12 converge as shown in Figs. 1 and 2, toward the center of the bottom wall so that the lubricant normally tends to collect in the center of the reservoir at which point the pump P is mounted.

Mounted above the bottom of the wall 10 of the crank case and in approximate parallel relation to the flat central portion 11 thereof is a drip pan 13 which member is preferably formed of sheet metal and is suitably supported at its terminals or marginal portions by shoulders 14 or equivalent elements as will be more readily noted upon reference to Fig. 1. The pan 13 is disposed to receive the lubricant as it escapes from the cam and crank shafts. It is necessary that this lubricant falling upon the pan be returned to the main reservoir and for this reason the pump P is connected to each terminal of the pan by means of independent conduits indicated at 15 and 16. The conduit 15 leads into a small collecting chamber 17 into which the lubricant flows from the terminal bearings of the cam and crank shafts and from the adjacent end of the pan through the bores or ducts 18 formed in the partition 19. The conduit 16, however, leads directly to the pan 13 and opens through the upper face thereof as indicated at 20.

From the description thus far given it now becomes apparent that the pump may act to continuously return the lubricant, which has been caught by the pan 13, to the main reservoir R regardless of the inclination of the engine bed to the horizontal, since the pump is operatively connected to both terminals of the pan by means of independent conduits.

In order to equally distribute the lubricant between the ends of the drip pan when the engine is in a normal horizontal position, I have provided a draining shed 21 which is formed by stamping up the central portion of the drip pan as in Figs. 1 and 2.

The lubricant in being returned to the reservoir R from the drip pan is drawn through the conduits 15 and 16 and is discharged over the upper end of the pump and into the reservoir as indicated in Fig. 1. The feed side of the pump P is connected to the cam shaft by means of a conduit indicated at 22. The lubricant which is forced through this conduit by the feeding gears of the pump is drawn from the main reservoir, but is first cleaned of all foreign matter by a screen 23. This screen 23 completely houses the pump and it is therefore apparent that the lubricant entering the feed side of the pump must first pass through the screen. The lubricant which is returned to the reservoir from the drip pan does not pass through the screen before entering the reservoir, however, since it is discharged over the top of the pump and over the outside of the screen. The general features of my improved lubricating system will now be fully appreciated. Obviously the lubricant contained in the reservoir R will, after having been cleaned of foreign matter by the screen 23, be started on its path through the conduit 22 by means of the feeding side of the pump. The lubricant passes from the conduit 22 into the cam shaft B from which it passes through the ducts F into the crank shaft C. The lubricant escapes from the crank shaft C through ducts 24 into the connecting rod caps 25 whence it passes up through the connecting rods by means of ducts 26 and into the pistons as at 27. The circulation of the lubricant is of course effected by virtue of the constant pressure maintained in the lubricated circuit by means of the pump.

The lubricant of course constantly escapes from the several bearings and falls upon the drip pan. From the drip pan the lubricant is returned to the main reservoir R by the pump through the medium of conduits 15 and 16, as previously explained.

The principal features of the lubricating system itself being thus disclosed, reference will now be had particularly to Figs. 3, 4, 5 and 6 in describing the details of construction of the preferred form of pump employed.

The body structure of the pump includes a base casting 29; a vertically disposed web 30 which is cross-shaped in cross section, and a circular head plate 31 which is carried on the upper end of the web 30 and preferably formed as an integral part thereof. The base casting 29 constitutes a housing for two sets of meshing gears, one of which operates to draw the lubricant through the conduits 15 and 16 and to discharge it into the main reservoir, and the other of which serves to draw the lubricant from the reservoir and forces it through the feed pipe 22.

The first mentioned set of gears are mounted in what will hereinafter be termed a return chamber 32, and the second mentioned set of gears is mounted in a chamber 33 which will hereinafter be referred to as the feed chamber of the pump. The base casting 29 is cored out as indicated at 34 in order that the pump may be as light as possible. The bottoms of the chambers 32 and 33 are open so that the gears may be inserted or removed during the assembling of the pump or when repairs are to be made. The base plate indicated at 35 is provided, however, to normally seal the bottoms of the chambers 32 and 33. This base plate also serves as a means for attaching the pump to the bottom wall 11 of the crank case, and is provided with screw or bolt receiving apertures indicated at 35ª, for reception of fastening elements to secure the pump to the crank case. Thus, as will be hereinafter more fully explained, the pump may be quickly removed from the crank case or applied thereto as a unit by the mere removal or insertion of the bolts or screws of the base plate 35.

Figure 7:
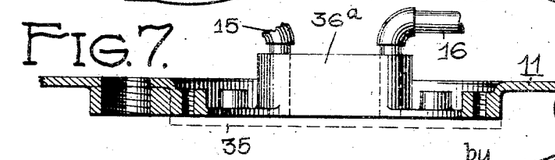
Fig. 7 is a detail section of the crank case bottom.

The conduits indicated at 36 and 37 lead into the return chamber 32 at diagonally opposite points as indicated at 38 and 39. The conduits 15 and 16 respectively lead into these two conduits 36 and 37 by way of the boss 36ª illustrated in Fig. 7 as formed integrally with the rim of the opening provided in the crank casing bottom 11 to inclose the pump. This boss receives the ends of the conduits 15 and 16, and serves to establish communication therebetween and the conduits 36 and 37 in such manner as to interfere in no way with the detachability of the pump. Conduits indicated at 40 and 41 lead from the return chamber 32 to the head plate 31 as in Figs. 3 and 4. It is through these two last mentioned conduits that the lubricant is discharged over the top of the head plate and down the outside of the screen 23 and into the reservoir R. The conduit indicated at 42 leads from the feed chamber 33 to the conduit 22, and the intake opening indicated at 43 is formed in the top 44 of the intake chamber 33 to admit the lubricant which filtered through the screen 23 into the feed chamber.

Within the return chamber 32 are mounted on shafts 45, 46 and 47 three spur gears 48, 49, and 50. These three shafts are arranged at the corners of an imaginary isosceles triangle, the shaft 46 being located at the apex of such triangle. These spur gears mesh with the close fit that is requisite in spur gear lubricating pumps. The shaft 46 extends upwardly through bearings 51 formed on the cross web 30 as in Fig. 3. The upper end of this shaft carries a worm gear 52. It will be seen upon reference to Fig. 6 that rotation of the shaft 46 will be transmitted through the gear 49 to the idler gears 50 and 48. The shafts of gears 50 and 48 are journaled in bearings 53 and 54 respectively, which are formed as integral parts of the base casting.

Within the feed chamber 32 is disposed the meshing spur gears 55 and 56 which are keyed upon shafts 57 and 58 respectively. The shaft 57 is journaled in a bearing 59 which is formed in an integral part in the base casting, while the shaft 58 extends upwardly through bearings 60 and through the head plate 31. Upon the upper terminal of this shaft 58 is keyed a worm gear 61.

Attention is now directed to the fact that the gears 52 and 61 are both meshed with a common actuating worm 62 which member is keyed upon an axle 63 journaled in bearings 64 formed upon the head plate. The rotation of the shaft 63 will of course be transmitted by means of the worm 62 to the worms 52 and 61. Thus the two shafts 46 and 58 are actuated from a common driving element. In actuating the shaft 63, I provide the jack shaft 65 which extends longitudinally through the crank casing and below the drip pan, as fully disclosed in Fig. 2, and is journaled in the partition wall 19 and the end wall of the crank casing. A gear 66 keyed upon the shaft 65 and a gear 67 keyed upon an axle 68 are employed in transmitting the rotation of the crank shaft to the shaft 35.

A coupling 69 which may be of any suitable type is employed in connecting the shafts 65 and 63. This coupling is preferably carried by the shaft 63 so that it may be removed with the pump in case repairs are necessary.

The actual construction and arrangement of the several parts of the pump being thus disclosed, it now remains to describe the manner in which these several parts co-act to draw the lubricant from the drip pan through the conduits 15 and 16 and to discharge it into the reservoir R, and to further explain the manner in which the lubricant is drawn from the reservoir and is fed under pressure through the conduit 22, to the lubricated circuit. In this connection reference will now be had primarily to Fig. 6.

Figure 6:
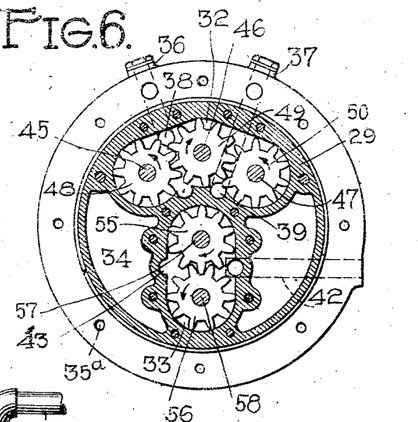
Fig. 6 is a section on the line 6—6 Fig. 3.

The shaft 46 will, upon rotation, through the medium of gear 49, cause the gears 47 and 48 to rotate in the opposite direction as indicated by arrows in Fig. 6.

Then, as will be seen upon reference to Fig. 6 the lubricant from one end of the drip pan will be sucked through the conduits 15 and 36 by means of the gears 48 and 49, while the lubricant from the other end of the drip pan will be sucked through the conduits 16 and 37 and into the chamber 32 by the gears 49 and 47. The lubricant drawn into the return chamber through these independent conduits will be forced out through the conduits 40 and 41 by the gears 48 and 49, and 49 and 47. Thus the return side of the pump is so designed that one set of gears is arranged in a novel manner to cause a simultaneous flow of lubricant from both ends of the drip pan into the return chamber of the pump and to force this supply of lubricant back into the main reservoir R through the conduits 40 and 41.

As indicated at 70 an annular trough or chamber is formed in the bottom wall of the crank case around the base casting of the pump. The trough is provided so that the sediment filtered by the screen 23 will collect upon the base casting 29. Thus when the pump is removed from the reservoir the sediment which has been collected in the reservoir will be simultaneously removed.

At the same time the shaft 56 will be rotating in response to the rotation of the worm 62 which member drives both the worms 61 and 62 as has been previously explained. The rotation of the shaft 58 causes the rotation of the meshing gears 55 and 56 which (assuming they are rotating in the direction indicated by arrows in Fig. 6) will draw the lubricant from the main reservoir into the chamber 33 by way of the opening 43. The lubricant drawn into the chamber 33 will be forced by the gears 55 and 56 through the conduit 42, from which it will pass into the conduit 22 and thereby returned to the lubricated circuit of parts hereinbefore described.

In concluding the description of my present invention I desire now to briefly direct attention as to what are some of its particularly novel features. The crank case is so shaped that the lubricant reservoir, which its bottom wall defines, induces a collection of the lubricant around the pump at all times, thus insuring a constant supply of lubricant to the feed side of the pump without regard to inclination of the engine bed.

The pump contains a duplex set of gears for simultaneously drawing the lubricant from both ends of the drip pan and discharging it back into the main reservoir, and a single set of gears for supplying the lubricant from the reservoir and feeding it under pressure to the lubricating circuit.

The pump is, while made in detachable sections for convenience in assembling or dis-assembling, designed as a unitary structure which may be readily applied to or removed from the crank case without requiring the dis-assemblage of this portion of the engine or of any other associated parts.

The lubricant falling upon the drip pan from the lubricated parts of the engine may be drawn back into the return side of the pump by both or either one of two independent but complemental return conduits which communicate with the drip pan at opposite ends or portions thereof.

In inclosing the lubricant reservoir in the manner stated, it is quite evident that the lubricant contained therein cannot, under any circumstances, drain wholly without the reach of the pump to render operation thereof ineffectual in feeding oil to the machine parts.

The pump is so designed that but a single set of gears is required to maintain forced flow of the lubricant through the conduits which connect the pump with the drip pan. The lubricant is, after being passed through the lubricated circuit of parts and returned to the main reservoir, filtered by a screening element prior to being again fed into the lubricated circuit.

What I claim is:

1. In a force feed lubricating system for a circuit of machine parts, a crank casing formed with a depressed bottom and sloping side walls to define a lubricant reservoir, a plural pump structure arranged within said reservoir, a means to supply the lubricant draining from the machine parts to the pump without first commingling the drained lubricant with the lubricant in said reservoir, and means connecting by independent paths said pump structure with said circuit.

2. In a force feed lubricating system for a circuit of machine parts, a main lubricant reservoir, a drip pan arranged above said reservoir, a plural pump structure located in said reservoir, conduits connecting said pump structure with said circuit, and conduits connecting the drip pan and the pump structure to conduct the oil draining from the machine parts to said pump structure without commingling the drained oil with the oil contained in said reservoir.

3. In a force-feed lubricating system for a circuit of machine parts, a lubricant reservoir, a collecting chamber, a drip pan, a plural pump structure, a conduit connecting the pump with one end of said circuit, and independent conduits connecting said pump with opposed portions of said pan.

4. In a force-feed lubricating system for a circuit of machine parts, a main lubricant reservoir, a drip pan arranged above the reservoir and formed with a central shed to drain toward opposed pan terminals, a plural pump structure located within the reservoir, and conduit means connecting by independent paths said pump structure with said circuit, and said pan with said pump structure.

5. In a force-feed lubricating system for a circuit of machine parts, a main lubricant reservoir, a collecting chamber forming one terminal for said circuit, a drip pan arranged below said parts, a plural pump structure located within the reservoir, means connecting the pump structure with said machine circuit, and independent means respectively connecting the pump structure with said pan and said chamber to convey in defined paths the oil draining from the machine parts onto the pan.

6. In a force feed lubricating system for a circuit of machine parts, a lubricant reservoir, a collecting chamber serving as one terminal for said circuit, a drip pan arranged below said machine parts and having one end in communication with said chamber, a plural pump structure located within the reservoir, a conduit connecting said pump structure with said circuit, and independent conduits connecting said pump structure respectively with said chamber and with the remote terminal of said pan.

7. In a force-feed lubricating system for a circuit of machine parts, a lubricant reservoir, a pump mounted within the reservoir, said pump having a return chamber formed therein, and conduits from said circuit entering said return chamber on opposite sides thereof.

8. In a force-feed lubricating system for a circuit of machine parts, a main lubricant reservoir, a pump located within the reservoir, means operable within the pump to receive lubricant returned from the circuit and to convey it exteriorly of the pump, and a screen element inclosing the pump.

9. In a force-feed lubricating system for a circuit of machine parts, a main lubricant reservoir, a pump located within the reservoir, means operable within the pump to draw lubricant from the reservoir to convey it to said circuit, and a screen inclosing the pump and in the path of the lubricant drawn thereinto.

10. In a force feed lubricating system for a circuit of machine parts, a lubricant reservoir, a plural pump structure located within the reservoir and having a return chamber and a feeding chamber formed therein, independent conduits leading from the reservoir to the return chamber, and a conduit leading from the feeding chamber to the circuit of machine parts.

11. In a force-feed lubricating system for a circuit of machine parts, a main lubricant reservoir, a unitary plural pump structure located within the reservoir and having a return chamber and a feeding chamber formed therein, conduits entering said return chamber from said circuit and leading therefrom into said reservoir, and conduits entering said feeding chamber from said reservoir and leading therefrom to said circuit.

12. In a force-feed lubricating system for a circuit of machine parts, a main lubricant reservoir, a drip pan serving as one terminal for said circuit, a pump located within the reservoir and having a return chamber provided therein, conduits leading from the pan to the chamber, and conduits leading from the chamber into the reservoir.

13. In a force-feed lubricating system for a circuit of machine parts, a main lubricant reservoir, a plural pump structure located within the reservoir and having a first chamber formed therein to receive lubricant to be returned to the reservoir and a second chamber formed therein to receive lubricant from the reservoir for translation to said circuit, and a screen housing inclosing the pump to separate said chambers.

14. In a force-feed lubricating system for a circuit of machine parts, a main lubricant reservoir, a plural pump structure mounted within the reservoir and having a first chamber formed therein to receive lubricant from said circuit and return it to said reservoir and a second chamber formed therein to receive lubricant from said reservoir and translate it to said circuit, and means operable in each of said chambers to control the designated movements of said lubricant.

15. In a force-feed lubricating system for a circuit of machine parts, a main lubricant reservoir, a plural pump structure mounted within the reservoir, said pump structure having a return chamber and a feeding chamber formed therein, duplex means in mesh in the return chamber for drawing lubricant thereinto from said circuit, and single means within said feeding chamber to draw lubricant thereinto from the reservoir.

16. In a force-feed lubricating system for a circuit of machine parts, a main lubricant reservoir, a plural pump structure mounted within the reservoir, a return chamber and a feeding chamber formed within the pump structure, duplex means in mesh in the return chamber for drawing lubricant thereinto from said circuit, means within said feeding chamber to draw lubricant thereinto from the reservoir, and means located within the chambers for driving said means.

17. In a force-feed lubricating system for a circuit of machine parts, a main lubricant reservoir, a drip pan collecting lubricant issuing from the circuit, a plural pump structure having a return chamber and a feeding chamber separately formed therein, a conduit connecting said feeding chamber with said circuit, conduits connecting said pan with said return chamber, separate conduits between respective chambers and the reservoir, and means located within each chamber for forcing the lubricant.

18. In a force-feed lubricating system for a circuit of machine parts, a main lubricant reservoir, a drip pan collecting lubricant issuing from the circuit, a plural pump structure having a return chamber and a feeding chamber separately formed therein, a conduit connecting said feeding chamber with said circuit, conduits connecting said pan with said return chamber, and a screen housing inclosing the pump structure to separate the chambers from the reservoir.

19. In a force-feed lubricating system for a circuit of machine parts, a main lubricant reservoir, a drip pan serving as one terminal for said circuit, a plural pump structure located within the reservoir and having a return chamber and a feeding chamber separately formed therein, means leading from said feeding chamber to the circuit, means leading from said pan to said return chamber, and separate means for establishing communication between said reservoir and said return chamber.

20. In a force-feed lubricating system for a circuit of machine parts, a lubricant reservoir, a plural pump structure located within the reservoir including a bottom casting, a top plate and a web connecting said plate and casting, the casting in turn being provided with chambers, one of said chambers being doubly connected with the exit portion of said circuit and the other of said chambers being connected to the inlet portion of said circuit, and means rotatably mounted in each of the chambers for controlling the flow of the lubricant between the reservoir and the circuit.

21. In a force-feed lubricating system for a circuit of machine parts, a main lubricant reservoir, a plural pump structure located within the reservoir and having a return chamber and a feeding chamber formed therein, means directing the lubricant to said return chamber from said circuit and leading from said return chamber into said reservoir, means entering said feeding chamber from said reservoir and leading therefrom to said circuit, and means operating as an entirety and located partially within each chamber for directing the flow of lubricant from the reservoir through the pump, through the circuit, through the pump structure and to the reservoir as indicated.

22. In a force-feed lubricating system for a circuit of machine parts, a lubricant reservoir, a plural pump structure located within the reservoir including a bottom casting, a top plate and a web connecting said plate and casting, the casting in turn being provided with chambers, one of said chambers being doubly connected with the exit portion of said circuit, the other of said chambers being connected to the inlet portion of said circuit, means rotatably mounted in each of the chambers for controlling the flow of the lubricant between the reservoir and the circuit, and a filtering element housing the pump to separate said chambers from each other and said reservoir.

23. In a force-feed lubricating system for a circuit of machine parts, a lubricant reservoir, a drip pan mounted above the reservoir to receive the lubricant escaping from the lubricated parts; a plural pump structure removably mounted in the reservoir, said pump structure including a duplex set of return gears, a singular set of feed gears, a plurality of discharge conduits for conducting the lubricant from the return gears back into the reservoir, complemental conduits leading from both terminals of the drip pan to the return gears, and means for actuating the return and feed gears, said means being detachable with respect thereto.

24. In a force-feed lubricating system for a circuit of machine parts, a main lubricant reservoir, a plural pump structure disposed within the reservoir, said pump being provided with a duplex series of return gears and a single set of feeding gears, independent conduits connecting the operating space for the return gears with both the fore and aft portions of the drip pan, a feed conduit leading from the operating space for the feed gears of the pump structure to the circuit, a jack shaft adapted to be driven from a suitable source of power, and a coupling member whereby the return and feed gears of the pump may be detachably connected to the jack shaft for actuation thereby.

25. In a force-feed lubricating system, the combination with a crank case of a pump detachably received within the crank case, conduits leading to the pump and means formed upon the crank case to receive the ends of the conduits, said means being in removable communication with said pump.

26. In a force-feed lubricating system, the combination with a crank case of a pump detachably received within the crank case; a base plate to fasten the pump upon said crank case, conduits leading to the pump and a boss formed on the crank case to accommodate the ends of said conduits, said boss being in communication with said pump through said base plate.

27. In a force-feed lubricating system, the combination with a crank case of a pump detachably received within the crank case, conduits arranged interiorly of the crank case and leading to the pump, a base plate formed upon the pump to engage the crank case exteriorly, and a boss formed integrally upon the crank casing to support the ends of said conduits and to establish communication therebetween and said base plate.

28. In a force-feed lubricating system, the combination with a crank case of a pump, a base plate for said pump exteriorly engaging said crank case to support the pump removably therein, conduits carried by said base plate in communication with said pump and opening outward through one surface of the plate, conduits leading to said pump interiorly of the crank case and a boss supporting the ends of said second conduits and apertured to establish communication therebetween and the said first conduits through the base plate openings of the latter.

29. In a force-feed lubricating system for a circuit of machine parts, a pump, a means to supply oil draining from the machine parts to the pump without commingling such drained oil with the oil in the reservoir, a screen inclosing the pump, a means to expel the oil from the pump to a point without the screen and to the interior of the reservoir, and means inclosed by the screen to pump the oil contained in the reservoir through the screen and thereafter again to the machine parts.

30. In a force-feed lubricant system for a circuit of machine parts, a main lubricant reservoir, a plural pump structure for circulating the lubricant comprising a base casting and a base plate designed to form with said casting, a receiving chamber, and means located in said receiving chamber to supply oil thereto from said reservoir and to thereafter forcibly feed the oil to such parts of the machine as require lubrication.

31. In a force-feed lubricant system for a circuit of machine parts, a main lubricant reservoir, a pump casing including a base casting and an underlying base plate of a construction forming with said casting, a receiving chamber, means to detachably secure the base plate to the reservoir whereby to effect a support for the pump casing, and a pump mechanism located in said casing to forcibly feed oil from the reservoir to the machine parts requiring lubrication.

32. A lubricating system for internal combustion engines including a lubricant reservoir located interiorly of the crank case of the engine, an imperforate drip pan interposed between the moving parts of the engine and said reservoir to catch the lubricant draining from said parts, means for forcibly feeding the lubricant draining onto the drip pan to said reservoir regardless of the angle of inclination of said engine, and means to forcibly feed the lubricant again to such of the engine parts as require lubrication.

33. In a system for lubricating an aeronautical motor, a container into which the lubricant draining from the machine parts is directed, a reservoir below said container, and a means of communication between the container and the reservoir of a construction permitting uninterrupted flow of the lubricant from the container to the reservoir without permitting of a back flow under any circumstances.

34. A lubricating system for aeronautical motors comprising a drainage reservoir disposed below the motor and adapted to receive oil drained from the various parts of the motor, a supply reservoir disposed immediately below said drainage reservoir from which lubricant is adapted to be delivered to the motor parts, a single communicating duct disposed between either end of the drainage reservoir and the supply reservoir and a force pump disposed in operative relation with the communicating ducts for continually withdrawing the oil from the drainage reservoir and supplying the same to said supply reservoir regardless of the flying position of the motor.

35. A lubricating system for aeronautical motors comprising a drainage reservoir extending longitudinally of the motor, a supply reservoir disposed immediately below said drainage reservoir from which oil is adapted to be delivered to the motor parts, supply ducts leading from either end of said drainage reservoir to said supply reservoir which ducts form the only means of communication between the reservoirs, and a force pump located in the communicating ducts for scavenging the oil from the drainage reservoir regardless of the flying position of the motor.

36. A lubricating system for aeronautical motors comprising a drainage reservoir extending longitudinally of the motor and arranged therebelow to receive the oil dripping from the various motor parts, a supply reservoir immediately below the drainage reservoir which is adapted to retain a lubricating oil, a pair of communicating ducts disposed between the supply reservoir and the ends of said drainage reservoir, said ducts forming the sole means of communication between said reservoirs, and a force pump located in the communicating ducts for returning the used oil from either end of the drainage reservoir to the supply reservoir regardless of the flying position of the motor.

37. A lubricating system for aeronautical motors comprising a drainage reservoir disposed below and longitudinally of the motor, said reservoir having a single opening at either end thereof, a supply reservoir arranged immediately below said drainage reservoir from which oil is adapted to be delivered to the motor parts and means operable to withdraw the lubricant from said drainage reservoir and deliver the same to said supply reservoir via at least one of said openings regardless of the flying position of the motor.

38. A lubricating system for aeronautical motors comprising a drainage reservoir disposed below the motor and having a single outlet opening at either end thereof, a supply reservoir arranged immediately below said drainage reservoir from which oil is adapted to be delivered to the motor parts, said supply reservoir being in communication with said drainage reservoir solely through said outlet openings, and a pump operating to withdraw lubricant from said drainage reservoir via at least one of said openings regardless of the flying position of the aeroplane with reference to the horizontal.

39. A lubricating system for aeronautical motors comprising a drainage reservoir disposed below and extending longitudinally of the motor, a supply reservoir disposed immediately below the said drainage reservoir from which oil is adapted to be delivered to the motor parts, a single communicating duct disposed between either end of the drainage reservoir and the supply reservoir, and means operating upon said communicating ducts for forcing lubricant from the drainage reservoir to the supply reservoir regardless of the angle of inclination of the motor.

40. A lubricating system for aeronautical motors comprising a drainage reservoir disposed below the motor and arranged to receive oil draining from the various motor parts, a supply reservoir disposed immediately below the drainage reservoir from which oil is adapted to be delivered to the motor parts, a communicating duct leading from either end of said drainage reservoir to said supply reservoir, said ducts being the sole means of communication between said reservoirs, and means for continuously withdrawing the used lubricant from the ends of said drainage reservoir through said communicating ducts and supplying the same to said supply reservoir and preventing the return of the lubricant from the supply reservoir to the drainage reservoir.

41. In an aeronautical motor, in combination, a crank casing, a partition immediately below the crank shaft which forms thereabove a drainage reservoir, the crank casing being depressed or enlarged to form a supply reservoir in the lower part thereof immediately below said partition, said drainage compartment having a single opening at either end thereof in communication with the lower compartment, means operating continuously to withdraw the used lubricant from the drainage compartment through said openings downwardly into said supply reservoir, and means including a force pump and a supply conduit for delivering oil from the supply reservoir to the motor parts to be lubricated.

42. In an aeronautical motor, in combination, a crank casing having formed in the lower part thereof a supply reservoir, an imperforate drip pan interposed between the moving parts of the engine and said supply reservoir to catch the lubricant draining from said parts, a communicating duct disposed between either end of the compartment above said drip pan and the lower supply reservoir, said ducts forming the sole means of communication between the upper and lower compartments, means for forcibly feeding the lubricant from said drip pan downwardly through said ducts to said supply reservoir regardless of the angle of inclination of the motor, and means for forcibly feeding the lubricant to such of the motor parts as require lubrication.

43. In an aeronautical motor, the combination, a crank casing having formed in the lower part thereof a supply reservoir, an imperforate drip pan interposed between the moving parts of the motor and said reservoir to catch the lubricant draining from said parts, a compartment at either end of said drip pan for receiving the used lubricant, a pair of supply ducts leading from said compartments downwardly to said supply reservoir, said ducts forming the sole means of communication between the compartments and said reservoir, means for forcibly feeding the lubricant downwardly from said compartments into said reservoir regardless of the angle of inclination of said motor, and means including a force pump and a supply conduit for delivering lubricant to such of the engine parts as require lubrication.

44. In an internal combustion engine, a crank case comprising in the lower part thereof a lubricant supply reservoir, said reservoir having in the lower side thereof an opening, a pump structure mounted within said opening and projecting into said reservoir for supplying the engine parts with lubricant, said pump structure being detachably and removably fixed within said opening.

45. In an internal combustion engine, a crank case comprising a lubricant reservoir in the lower part thereof, said reservoir having formed in the bottom thereof an opening, a unitary pump structure adapted to be inserted upwardly through said opening into said reservoir, and means for detachably securing said pump structure within said opening.

46. In an aeronautical motor, in combination, a drainage reservoir disposed below the moving parts of the motor, a supply reservoir from which lubricant is adapted to be delivered to the motor parts, a plural pump structure mounted upon the bottom of said supply reservoir, said pump structure having in the lower part thereof a receiving chamber in communication with either end of said drainage reservoir for receiving the used lubricant therefrom, said pump structure also having conduits leading from said receiving chamber upwardly into said supply reservoir, and means including a supply conduit for returning the lubricant from said supply reservoir to the motor parts.

47. In an aeronautical motor, in combination, a drainage compartment disposed below the moving parts of the motor, a reservoir from which the lubricant is adapted to be delivered to the moving motor parts, a plural pump structure mounted on the bottom of said supply reservoir and having therearound a filtering screen, said pump structure having a receiving chamber in communication with either end of said drainage compartment for receiving the used oil therefrom, said pump structure also having conduits leading from said receiving chamber into the supply reservoir outside of said screen, said pump structure having a supply chamber communicating with said reservoir through said filtering screen and also communicating with the moving motor parts through a supply conduit.

48. In an aeronautical motor, in combination, a drainage compartment disposed below the moving parts of the motor, a reservoir from which the lubricant is adapted to be forced to the moving motor parts, a plural pump structure mounted on the bottom of said supply reservoir and having therearound a filtering screen, said pump structure having a receiving chamber in communication with either end of said drainage compartment for receiving the used oil therefrom, said pump structure also having conduits leading from said receiving chamber into the supply reservoir outside of said screen, said pump structure having a supply chamber communicating with said reservoir through said filtering screen and also communicating with the moving motor parts through a supply conduit, said pump structure and screen being detachably mounted in an opening formed on the bottom of said supply reservoir.

49. In an internal combustion engine, a crank casing having formed in the lower part thereof a supply reservoir, an imperforate drip pan interposed between the moving parts of the engine and said supply reservoir to catch the lubricant draining from said parts, a communicating duct disposed between the compartment above said drip pan and the supply reservoir, and means within said duct permitting the flow of lubricant from the compartment above the drip pan to the reservoir, but preventing a flow in the reverse direction, for the purpose set forth.

50. A lubricating system for aeronautical motors comprising a lubricant reservoir below the cylinders and crank shaft of the motor, means for feeding lubricant from the reservoir to the moving parts of the motor, a partition interposed beneath said cylinders and intermediate the same and the reservoir for preventing the flow of lubricant from the reservoir into the cylinders, and means conveying lubricant from above the partition to the reservoir but preventing back flow of lubricant from the reservoir to the cylinders whereby stalling of the motor due to flooding of the lubricant flowing from the reservoir to the cylinders is prevented when the motor is operating at sharp angles of inclination or upside down.

In testimony whereof I affix my signature.

CHARLES B. KIRKHAM.